United States Patent
Berke et al.

(10) Patent No.: US 8,205,436 B2
(45) Date of Patent: Jun. 26, 2012

(54) UNINTENDED EXOTHERMAL REACTIONS MONITORING FOR DIESEL AFTER-TREATMENT SYSTEMS

(75) Inventors: Paul L. Berke, Chicago, IL (US); Massimo Fontana, Chicago, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 328 days.

(21) Appl. No.: 12/611,140

(22) Filed: Nov. 3, 2009

(65) Prior Publication Data
US 2011/0099982 A1 May 5, 2011

(51) Int. Cl.
*F01N 3/00* (2006.01)
(52) U.S. Cl. ............... 60/277; 60/297; 60/299
(58) Field of Classification Search ........... 60/274, 60/277, 295, 297, 299
See application file for complete search history.

(56) References Cited

U.S. PATENT DOCUMENTS

| | | | | |
|---|---|---|---|---|
| 6,003,307 A * | 12/1999 | Naber et al. | | 60/274 |
| 6,988,361 B2 * | 1/2006 | van Nieuwstadt et al. | | 60/295 |
| 7,299,626 B2 * | 11/2007 | Barasa et al. | | 60/297 |
| 2006/0168947 A1 * | 8/2006 | Durnholz et al. | | 60/289 |
| 2007/0193258 A1 * | 8/2007 | Berke | | 60/297 |
| 2009/0012694 A1 * | 1/2009 | Darr et al. | | 701/102 |
| 2009/0107118 A1 * | 4/2009 | Ruona | | 60/286 |
| 2011/0000193 A1 * | 1/2011 | Paterson et al. | | 60/277 |
| 2011/0023590 A1 * | 2/2011 | Van Nieuwstadt et al. | | 73/114.73 |
| 2011/0099982 A1 * | 5/2011 | Berke et al. | | 60/277 |

\* cited by examiner

*Primary Examiner* — Thomas Denion
*Assistant Examiner* — Patrick Maines
(74) *Attorney, Agent, or Firm* — Mark C. Bach; Jeffrey P. Calfa

(57) ABSTRACT

An algorithm or diagnostic for detecting and alarming unintended exothermic conditions in exhaust after treatment components selectively detects alarming temperature variations in exhaust after treatment components when caused by internal unintended exothermal events, rather than transient conditions that are externally driven. Not only are the output temperature and the delta temperature (T_out−T_in) across the component monitored in each after-treatment device, but also the input temperature is deeply analyzed through its recent history data in order to determine if any input variations caused the output changes.

7 Claims, 3 Drawing Sheets

UNINTENDED EXOTHERMAL REACTIONS MONITORING FOR DIESEL AFTER-TREATMENT SYSTEMS

TECHNICAL FIELD

This invention relates generally to motor vehicles, such as trucks, that are powered by internal combustion engines, particularly diesel engines that have exhaust gas treatment devices for treating exhaust gases passing through the exhaust systems.

BACKGROUND

DPF Regeneration

A known system for treating exhaust gas passing through an exhaust system of a diesel engine comprises a diesel oxidation catalyst (DOC) that oxidizes hydrocarbons (HC) to $CO_2$ and $H_2O$ and converts NO to $NO_2$, and a diesel particulate filter (DPF) that traps diesel particulate matter (DPM). DPM includes soot or carbon, the soluble organic fraction (SOF), and ash (i.e. lube oil additives etc.). The DPF is located downstream of the DOC in the exhaust gas flow. The combination of these two exhaust gas treatment devices prevents significant amounts of pollutants such as hydrocarbons, carbon monoxide, soot, SOF, and ash, from entering the atmosphere. The trapping of DPM by the DPF prevents black smoke from being emitted from a vehicle's exhaust pipe.

The DOC oxidizes hydrocarbons (HC) and converts NO to $NO_2$. The organic constituents of trapped DPM within the DPF, i.e., carbon and SOF, are oxidized within the DPF, using the $NO_2$ generated by the DOC, to form $CO_2$ and $H_2O$, which can then exit the exhaust pipe to atmosphere.

The rate at which trapped carbon is oxidized to $CO_2$ is controlled not only by the concentration of $NO_2$ or $O_2$ but also by temperature. Specifically, there are three important temperature parameters for a DPF.

The first temperature parameter is the oxidation catalyst's "light off" temperature, below which catalyst activity is too low to oxidize HC. Light off temperature is typically around 250° C.

The second temperature parameter controls the conversion of NO to $NO_2$. This NO conversion temperature spans a range of temperatures having both a lower bound and an upper bound, which are defined as the minimum temperature and the maximum temperature at which 40% or greater NO conversion is achieved. The conversion temperature window defined by those two bounds extends from approximately 250° C. to approximately 450° C.

The third temperature parameter is related to the rate at which carbon is oxidized in the filter. Reference sources in relevant literature call that temperature the "Balance Point Temperature" (or BPT). It is the temperature at which the rate of oxidation of particulate, also sometimes referred to as the rate of DPF regeneration, is equal to the rate of accumulation of particulate. The BPT is one of the parameters that determine the ability of a DPF to enable a diesel engine to meet expected tailpipe emissions laws and/or regulations.

Typically, a diesel engine runs relatively lean and relatively cool compared to a gasoline engine. That factor makes natural achievement of BPT problematic.

Therefore, a DPF requires regeneration from time to time in order to maintain particulate trapping efficiency. Regeneration involves the presence of conditions that will burn off trapped particulates whose unchecked accumulation would otherwise impair DPF effectiveness. While "regeneration" refers to the general process of burning off DPM, two particular types of regeneration are recognized by those familiar with the regeneration technology as presently being applied to motor vehicle engines.

The term "passive regeneration" is generally understood to mean regeneration that can occur anytime that the engine is operating under conditions that burn off DPM without initiating a specific regeneration strategy embodied by algorithms in an engine control system. The term "active regeneration" is generally understood to mean regeneration that is initiated intentionally, either by the engine control system on its own initiative or by the driver causing the engine control system to initiate a programmed regeneration strategy, with the goal of elevating temperature of exhaust gases entering the DPF to a range suitable for initiating and maintaining burning of trapped particulates.

The creation of conditions for initiating and continuing active regeneration, whether forced or not, generally involves elevating the temperature of exhaust gas entering the DPF to a suitably high temperature.

Intended Exothermic Reaction-DPF Regeneration

There are several methods for initiating a forced regeneration of a DPF such as retarding the start of main fuel injections or post-injection of diesel fuel to initiate an exothermic reaction in the DOC to elevate exhaust gas temperatures entering the DPF while still leaving excess oxygen for burning the trapped particulate matter.

These methods are able to increase the exhaust gas temperature sufficiently to elevate the catalyst's temperature above catalyst "light off" temperature and provide excess HC that can be oxidized by the catalyst. Such HC oxidation is an intended exothermic reaction that provides the necessary heat to raise the temperature in the DPF above the BPT.

The amount of HC and CO generated by the engine may sometime exceed the stoichiometric quantity of NOx that is to be reduced over the catalyst. This leads to HC and CO breakthroughs at the DOC outlet ("HC/CO slip"), wherein the HC/CO slip cannot be oxidized to $CO_2$ and $H_2O$.

Unintended Exothermic Reaction

The present inventors have recognized that an unintended exothermal condition may present an elevated risk of permanent damage to after-treatment components.

The present inventors have recognized an unintended exothermal condition can be caused by different conditions including engine misfiring, incorrect calibration of engine controls, damaged injector, excessive soot accumulation in the DPF and passive regeneration, HC slipping, or malfunctioning external fuel dosing systems.

SUMMARY

An exemplary system and method of the present invention includes an algorithm or diagnostic that selectively detects alarming temperature variations only when caused by internal exothermal events, rather than transient conditions that are externally driven.

To achieve that, not only the output temperature and the delta temperature (T_out−T_in) across the component are monitored in each after-treatment device, but also the input temperature is deeply analyzed through its recent history data in order to determine if any input variations caused the output changes. The diagnostic won't react if the temperature increment in the component is driven by a temperature increment of the input exhaust gas flow.

Particularly, the input gas temperature gradient and the partial (1P) and total (3P) input variations at a tunable sample time and delay, depending on the gas space velocity, are monitored. This is necessary to address the factor that the time delay relative to the heat propagation for convection of the exhaust gas in the component is variable, mainly based on the gas space velocity. The algorithm acquires sequences of four samples of the input gas temperature at a variable sample time which is a function of the gas space velocity. Four samples should be an effective number of samples to be efficiently processed considering computational limits of the engine control processor, and understanding that temperature varies relatively slowly by its own nature.

Each sample Tn and its precedent sample Tn−1 represent a basic partial interval, referred to as 1P. The last (fourth) and the first sample of the sequence represent the whole interval, referred to as 3P, or total window of monitoring. Three partial temperature absolute variations are calculated, taking the absolute values of (T4−T3), (T3−T2) and (T2−T1). The maximum temperature variation between the intervals is considered. Also, the maximum and the minimum of the four sample temperatures of the sequence are taken and the variation (Tmax−Tmin) is calculated. The diagnostic won't set any fault if at least one of the maximum partial variation and the maximum total variation is higher than its respective threshold; this means that the input gas temperature has been changing, so an output gas temperature change is expected driven by the input gas temperature, and not by an internal exothermal reaction.

In other words, at a give instant T=(n*t_sample) the diagnostic considers four samples of temperature upstream DOC:

$$T4 = T(n)$$

$$T3 = T(n-1)$$

$$T2 = T(n-2)$$

$$T1 = T(n-3)$$

The diagnostic then calculates the maximum absolute variation between the three partial time intervals:

$$\text{Delta\_partial} = \text{Max}(|T4-T3|, |T3-T2|, |T2-T1|)$$

Also the diagnostic takes the maximum and the minimum temperature in the whole window between T1 and T4:

$$T\text{max} = \text{Max}(T4, T3, T2, T1)$$

$$T\_\text{min} = \text{Min}(T4, T3, T2, T1)$$

Then the diagnostic calculates the maximum variation in the interval:

$$\text{Delta\_tot} = T\text{max} - T\text{min}$$

Finally the diagnostic compares the two values Delta_partial and Delta_tot with reference values and if at least one of the values is higher than the corresponding reference then the diagnostic is inhibited and no fault will be set:

IF (Delta_partial>dp*) OR (Delta_tot>dt*)

THEN inhibit diagnostic and no fault set.

To further address the heat propagation time delay concern, the whole monitoring window, meaning the sequence of four samples, is delayed by a variable discrete time delay depending again on the gas space velocity. This means that the four samples which are processed instantaneously at the present time t are in reality the samples which have been acquired at a past previous time depending on space velocity. This solves the issue of synchronizing actual data of the output gas temperature with older data of the input gas temperature when the variations might be happened.

Also, when a stationary event is detected because of a big delta T over the component, an SR flip flop ensures that the fault stay on until the T_out falls below a tunable threshold, even if in the meantime the delta T was reduced because the input was raised for heat propagation.

The detection algorithm is divided into three main subsystems:

a peak fault detection is made if the temperature downstream of the component is higher than a threshold at any time;

a "dynamic" fault detection is made, in order to react when the temperature is rapidly increasing, before the temperature causes damage, if the time derivative of the temperature downstream of the component is higher than a threshold and the time derivative of the temperature upstream of the component is lower than another threshold; and a "static" detection is made, in order to react when slow exothermal reactions are occurring, if the temperature downstream is increasing, AND the average temperature in the component is higher than a threshold, AND the exothermal reaction temperature difference Tout−Tin is higher than a map-based variable threshold, AND the upstream temperature recent past check determines that the temperature hasn't been increasing.

According to an exemplary method of the invention, the exhaust after-treatment system (DOC and DPF) temperatures are monitored in order to detect alarming changes, possible symptoms of unintended and uncontrolled exothermal reactions. Accordingly a fast detection and reaction are provided for engine protection.

Once an unintended exothermal condition is sensed, an after-treatment "limp home" mode can be provided. The logic can be integrated in an already existing limp home mode strategy which is called in case of after-treatment (AT) system errors, and results in torque and engine speed limitations.

Also, once an unintended exothermal condition is sensed, the total injected fuel quantity can be reduced. Since the causes of an unintended and uncontrolled exothermal reaction are unknown/unpredictable by the software, one strategy could be to reduce or shut off the primary source of energy/heat in the engine, the fuel.

Alternately, once an exothermal condition is sensed, the cooling system electric fan can be activated. It doesn't eliminate the cause, but the fan could be helpful to cool down the overall system, such as the after-treatment, the engine, the transmission, quickly to prevent heat propagation to other parts.

A degraded mode regeneration error certainly means a hardware issue, the best intervention could be changing the regeneration status to the degraded mode, and setting the engine light in the cluster to inform the driver that maintenance is needed.

Accordingly, monitoring can include: calculation of average AT components temperatures; calculation of exhaust gas space-velocities; monitoring enabling conditions; detection of dangerous peaks, time-gradients (dynamic monitoring), space-gradients (static monitoring) of temperature in each AT component; and evaluation of the severity of the condition for fault management.

Numerous other advantages and features of the present invention will be become readily apparent from the following detailed description of the invention and the embodiments thereof, from the claims and from the accompanying drawings.

DETAILED DESCRIPTION

Figure 1:
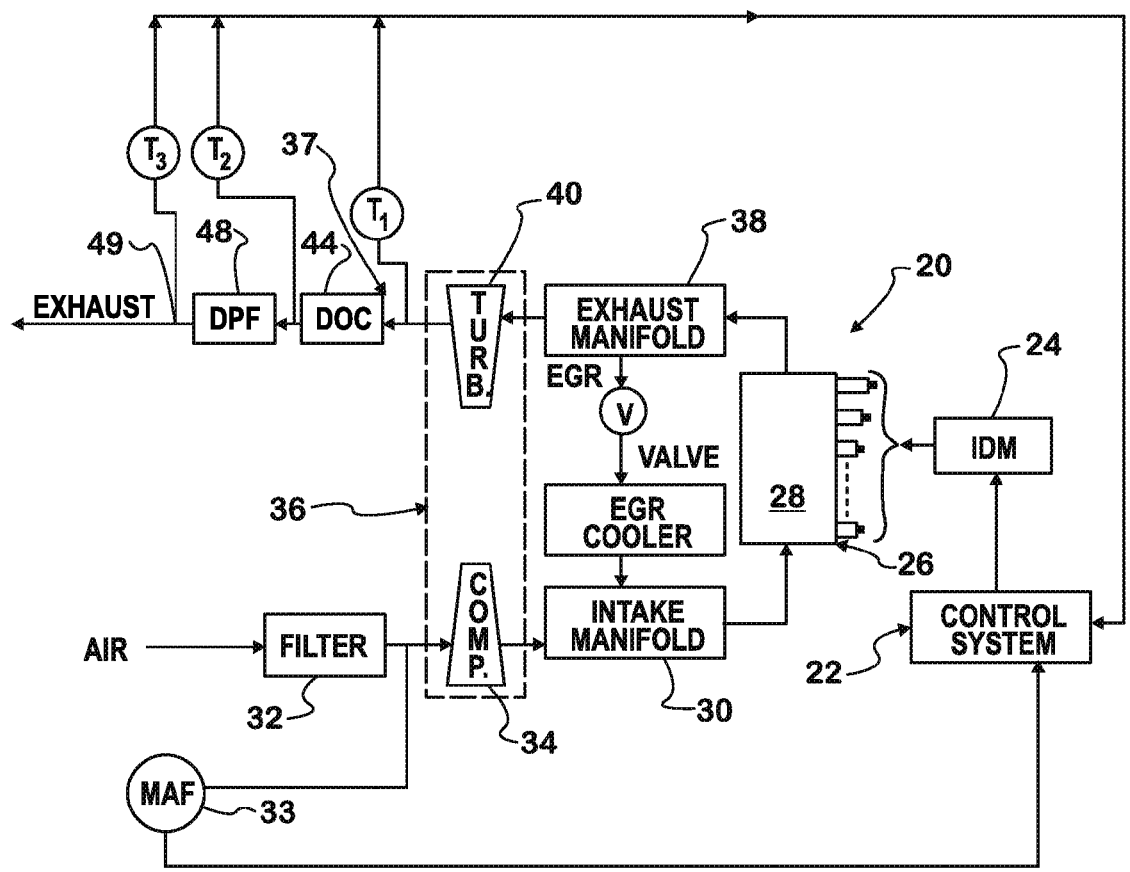
FIG. 1 is a schematic illustration of a representative diesel engine and control with exhaust after-treatment devices, that incorporates a system in accordance with the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows a schematic diagram of an exemplary diesel engine 20 for powering a motor vehicle. Engine 20 has a processor-based engine control 22, such as an engine electronic control unit or module. The control 22 processes data from various sources to develop various control data for controlling various aspects of engine operation. The data processed by control 22 may originate at external sources, such as sensors, and/or be generated internally.

Control 22 includes an injector driver module 24 for controlling the operation of electric-actuated fuel injectors 26 that inject fuel into combustion chambers in the engine cylinder block 28. A respective fuel injector 26 is associated with each cylinder and comprises a body that is mounted on the engine and has a nozzle through which fuel is injected into the corresponding engine cylinder. A processor of engine control system 22 can process data sufficiently fast to calculate, in real time, the timing and duration of injector actuation to set both the timing and the amount of fueling.

Engine 20 further comprises an intake system having an intake manifold 30 mounted on block 28. A compressor 34 of a turbocharger 36 is upstream of manifold 30. The compressor 34 could be a multi-stage compressor. A compressed air charge cooler and/or an inter-stage air cooler can be provided to cool the compressed air. Compressor 34 draws air through an air filter 32 to create charge air that enters each engine cylinder from manifold 30 via a corresponding intake valve that opens and closes at proper times during engine cycles. A mass air flow ("MAF") sensor 33 is provided in the air intake path and is connected to control 22.

Engine 20 also comprises an exhaust system 37 through which exhaust gases created by combustion within the engine cylinders can pass from the engine to atmosphere. The exhaust system comprises an exhaust manifold 38 mounted on block 28. Exhaust gases pass from each cylinder into manifold 38 via a respective exhaust valve that opens and closes at proper times during engine cycles.

The turbocharger 36 further comprises a turbine 40 associated with the exhaust system and coupled via a shaft to the compressor 34. Hot exhaust gases acting on turbine 40 cause the turbine to operate compressor 34 to develop the charge air that provides boost for engine 20.

The exhaust system further comprises two AT components, a DOC housing 44 and a DPF 48 in series downstream of the turbine 40. The DOC and the DPF treat exhaust gas before it passes into the atmosphere through an exhaust pipe 49. Although the DOC housing 44 and the DPF 48 are shown as separate components, it is also possible that the DOC housing 44 and the DPF 48 share a common housing.

DPF 48 physically traps a high percentage of DPM in exhaust gas passing through it, preventing the trapped DPM from passing into the atmosphere. Oxidation catalyst within the DOC housing 44 oxidizes hydrocarbons (HC) in the incoming exhaust gas to $CO_2$ and $H_2O$ and converts NO to $NO_2$. The $NO_2$ is then used to reduce the carbon particulates trapped in DPF 48.

According to the exemplary embodiment of the invention, three temperature sensors T1, T2, T3 are provided in the exhaust system 37. The sensor T1 is upstream of the DOC housing 44, the sensor T2 is located downstream of the DOC housing 44 and upstream of the DPF 48, and the sensor T3 is located downstream of the DPF 48. The sensors T1, T2, T3 are each signal-connected to the control 22.

Calculation of Average Components Temperatures

Each after-treatment (AT) component average temperature is calculated according to this formula:

$$T\_ave = (T\_in) + (T\_out - T\_in) \times (c\_fac)$$

where:
T_ave=average component temperature
T_in=upstream temperature
T_out=downstream temperature
c_fac=tunable factor
c_fac is a calibratable factor between 0 and 1 used as weighting factor in this way:
  If set to 0, then T_ave=T_in
  If set to 1, then T_ave=T_out
  If set to something between 0 and 1, than it's a "tunable average" of T_in and T_out The tunable factor c_factor gives the developer has the ability to tune it to choose the temperature he consider better representative, or worst case. The tunable factor c_factor can be selected based on dynamometer and vehicle testing.

Accordingly, for the DOC housing 44, T_in is sensed by the sensor T1, and T_out is sensed by the sensor T2. For the DPF 48, T_in is sensed by the sensor T2 and T_out is sensed by T3.

Calculation of Exhaust Gas Space-Velocity

The "exhaust gas space velocity" sv_gas represents a chemical index of the velocity of each unit of mass of gas in a defined volume, i.e., the volume of the particular AT component. It is measured in [1/s] and can be formulated as follow:

$$sv\_gas = \frac{\dot{V}_{gas}}{Vol} = \frac{[L/s]}{[L]} = [1/s]$$

where $$\dot{V}_{gas} = \frac{MAF\_KGH\_PF * 1000 * 22.4}{(gas\_molecular\_weight) * 3600} = \frac{[Kg/h] * [g/Kg] * [L/mol]}{[g/mol] * [s/h]} = \frac{[L]}{[s]}$$

MAF_KGH_PF is engine intake mass air flow
L=liters
s=seconds
h=hours
Gg=grams
mol=moles
Kg=kilograms
and Vol=volume, displacement in liters of the device, such as the DOC or the DPF.

This formulation has two main limitations:
1. The calculation of the gas molecular weight is subject to a high degree of imprecision. However, since the weight of different molecules forming the exhaust gas can sensibly differ (1:2), the gas percentage composition is approximated as in a typical emission cycle result; and
2. The intake air flow MAF can be considered equal to the exhaust gas flow only in stationary condition. During transients, when the system pressures change, the two flows are different by a quantity equal to the gas mass variations in the system:

$$\dot{m}_{exh} = maf - \frac{dm_{EM}}{dt} - \frac{dm_{IM}}{dt}$$

where:

$\frac{dm_{EM}}{dt}$ = exhaust manifold gas mass variation $\frac{dm_{IM}}{dt}$ = intake manifold gas mass variation Each mass variation can be determined differentiating the respective perfect gas law:

$$m(t) = \frac{P(t)}{T(t)} * \frac{V}{R}$$

For after-treatment design purposes, these variations can be considered negligible, in order to simplify the algorithm.

Gas space velocity is one of the inputs to select stored maps and curves which produce:
  Threshold of delta T (Tout−Tin) permitted; when actual delta T is higher than this threshold, an exothermal reaction (stationary) is detected. Map also depends on T avrg
  Variable sampling time for T input monitoring
  Variable time delay for T input monitoring Monitoring Activation Conditions Three conditions need to be simultaneously fulfilled to enable the monitoring for unintended exothermal conditions:
1. The array LF_ERR_PF_CAT_PLAUS is a 32 bit array which summarizes all the other AT diagnostic errors and is compared with a calibration 32 bit mask; if any of the correspondent couples of bit at the same bit position are both 1, the diagnostic is turned off because it means another AT error has occurred which would prevent the correct operation of the unintended exothermal diagnostic;
2. Intended regeneration strategy must be deactivated (SF_LEVEL_RGN_PF=0); In fact this diagnostic doesn't monitor temperatures during intended regenerations, when the temperatures are controlled in order to properly cause the reactions which lead to soot burning for DPF cleaning; and
3. Starting from the end of the last regeneration, the monitoring is delayed for a minimum tunable time period, allowing the after-treatment system to return to normal conditions.

Alarming Temperature Detection

An ongoing unintended exothermal condition can be detected for high risk consequences; and at the same time, unnecessary limp home modes for occasional transitorily events can be avoided.

To better distinguish between the various combinations occurring during reported events, the monitoring has been divided in three main areas.

Detection of Temperature Peaks

This is a condition which triggers a high severity fault detection when the temperature downstream of an AT component is higher than a tunable threshold.

Detection of High Temperature Time-Gradient (Dynamic Monitoring)

This condition triggers a fault detection when the temperature downstream an AT component is rising very fast, despite to the upstream temperature which is staying quite stationary. It should have medium-high severity.

Detection of High Temperature Space-Gradient (Static Monitoring)

This condition is intended for the detection of a quasi-stationary exothermal event, and is mainly based on a delta-temperature comparison and an input analysis in order to catch only conditions generated internally in the component. The threshold for delta T (Tout−Tin) is determined as a function of T_ave and gas space velocity, decoupling the engine system from the AT system. Each AT component is modeled through a simplified energy balance model; the entry energy is represented by the heat of the exhaust gas upstream, the exit energy is measured by the heat of the exhaust gas downstream. The heat energy of a gas flow can be modeled as:

$$\dot{m}*c_p*T$$

Where:
  $\dot{m}$ is the gas flow (Kg/h),
  $c_p$ is the specific heat at constant pressure,
  T is the temperature.

In quasi-stationary conditions, considering constant pressure in the AT system, the entry flow equals the exit flow, so the balance between entry and exit energy is:

$$\dot{m}*c_p*(T_{out}-T_{in})$$

In normal conditions, it is expected that:

$$\dot{m}*c_p*(T_{out}-T_{in}) \approx 0$$

This implies that:

$$(T_{out}-T_{in}) \approx 0$$

This also means that all the energy entering the component is also leaving the component.

If instead we measure: $(T_{out}-T_{in}) \gg 0$, this means that some energy has been converted inside the device, i.e., some not-expected exothermal event has occurred. Typical (chemical) reactions happening inside the DOC and DPF are connected to fuel or HC (hydrocarbon) combustion, and rarely to passive regeneration due to soot burning. For this reason, this diagnostic is important to detect any uncontrolled chemical reaction which could occur in the AT system and could potentially damage the AT system irreversibly. The diagnostic can also signal important hardware or control issues of improper fuel injection.

The maximum delta T (Tout−Tin) threshold is determined by a function of T_ave and space velocity, which are factors determining the heat propagation between exhaust gas and AT component.

The input temperature T_in analysis prevents, as already explained, the setting of fault conditions when the delta T (Tout−Tin) is only due to the delay on the heat propagation phenomenon, which again is function of temperature and space velocity. It basically compensates for the misalignment on time of the data.

Alarming Temperature Detection—FAULT

Figure 2:
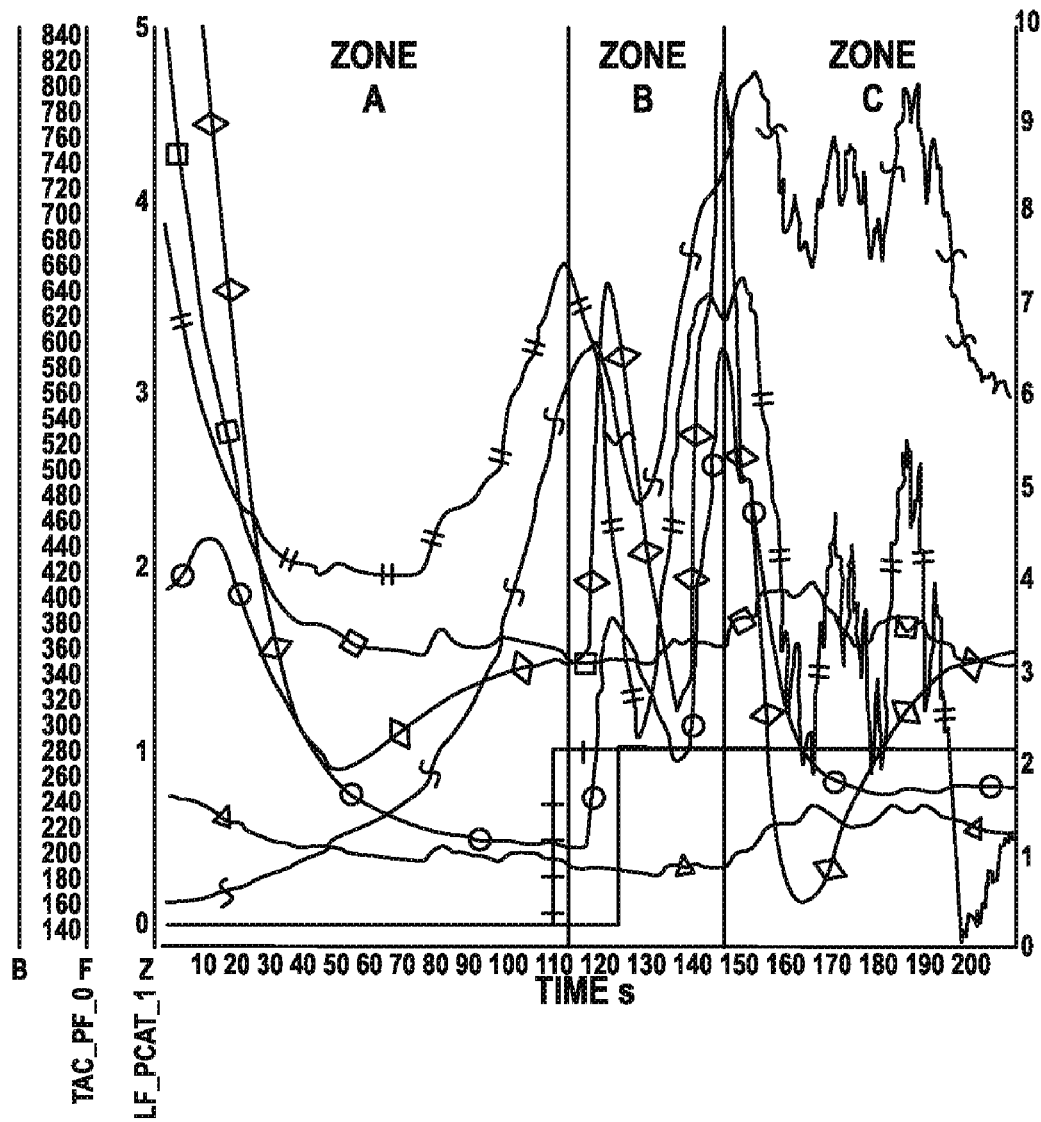
FIG. 2 is a temperature versus time chart for a FAULT condition.
Figure 3:
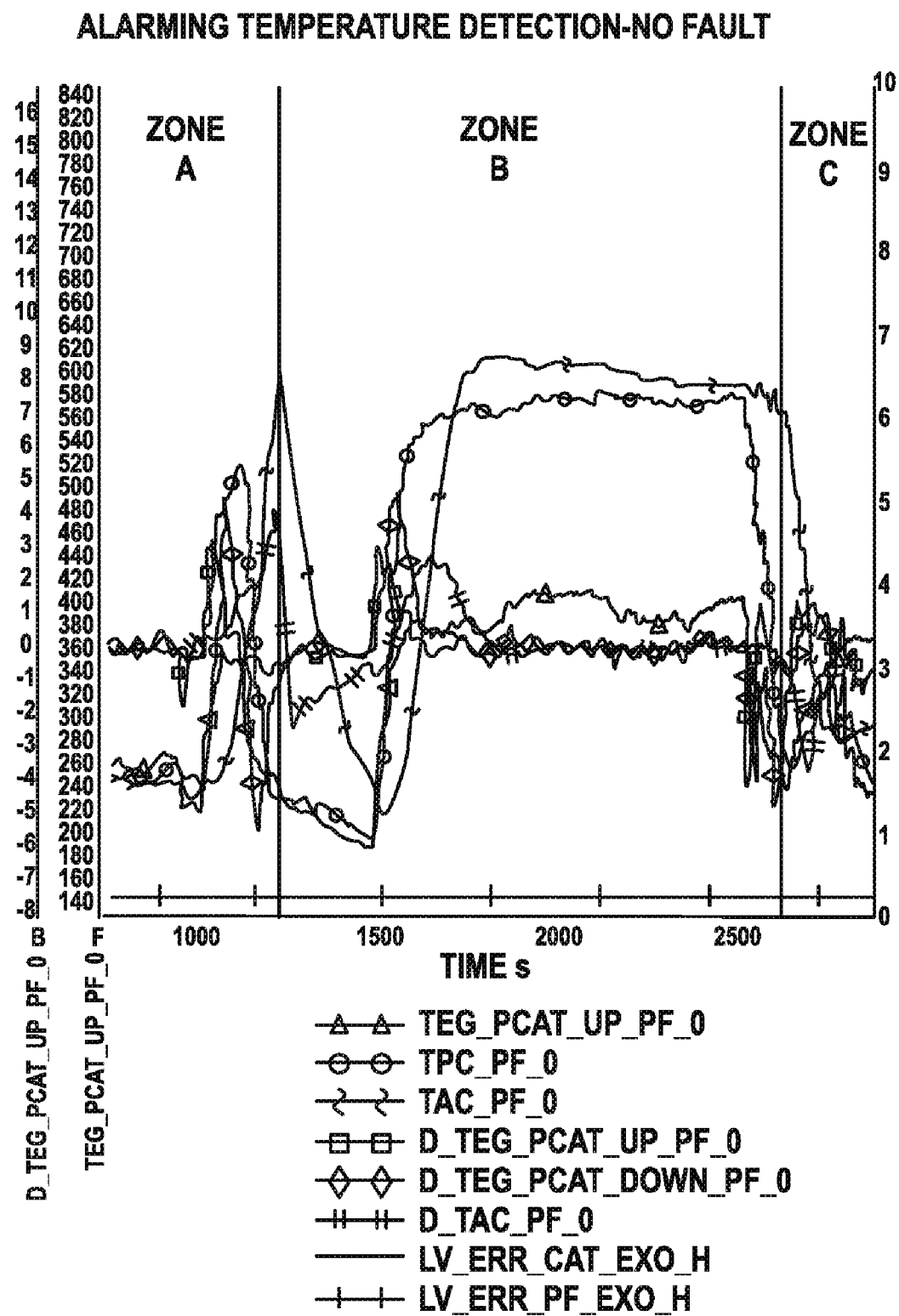
FIG. 3 is a temperature versus time chart for a NO FAULT condition.

FIG. 2 shows a fault detection condition. The parameters shown are:
TEG_PCAT_UP_PF_0 is the temperature upstream of the DOC;
tpc_pf_0 is the temperature upstream of the DPF (downstream of the DOC);
tac_pf_0 is the temperature downstream of the DPF;
D_TEG_PLAT_UP_PF_0 is the temperature gradient upstream of the DOC;
D_TEG_PCAT_DOWN_PF_0 is the temperature gradient upstream of the DPF (downstream of the DOC);
D_TAC_PF_0 is the temperature gradient downstream of the DPF;

LV_ERR_CAT_EXO_H is an error flag for exothermic reaction in the DOC; and
LV_ERR_PF_EXO_H is an error flag for exothermic reaction in the DPF.

Zone "A"

The DOC out tpc_pf has a medium peak (450° C.) and then is falling (gradient<0). The diagnostic won't activate an alarm condition. The DPF out tac_pf is rising, first slower then faster. The diagnostic will activate the dynamic fault condition when close to cursor 1 due to the high positive gradient. Also, it won't activate the static fault condition because, even if the delta T is big, part of this increment is due to the previous input temperature tpc_pf increment.

Zone "B"

The DOC out tpc_pf rises very fast and triggers the dynamic condition due to this high gradient, while the input teg_pcat_up is quite stationary. When close to cursor 2 all the three conditions are on since tpc_pf is high and rising fast while the input teg_pcat is low and rising very slowly since a long time before.

The DPF out tac_pf is falling and then rising fast again. This behavior will trigger the peak when above 700° C., the dynamic part but only until the input is decreasing, and the stationary part because the big delta T can't be related to the input variations which happen almost simultaneously.

Zone "C"

The DOC out tpc_pf is falling. All the three conditions will turn off, but the fault will stay on for the time necessary for the counter to decrement below the activation threshold.

The DPF out tac_pf remains high while the input falls. This confirms the exothermal reaction is also on the DPF, so the stationary condition stays on thanks to the flip flop which holds the status even if the input changes.

Alarming Temperature Detection—NO FAULT

Zone "A"

The DOC out tpc_pf has a quite rapid increment which however is too small (check the time scale) to trigger the dynamic part. Also, since the variations of the input are also big, it won't trigger the stationary part.

DPF out tac_pf following increment is too small for the dynamic, and won't activate the stationary part because it is only due to the previous input rise, rather than a real internal exothermal condition.

Zone "B"

Again, for both DOC and DPF the output rise is following an input rise, so it won't activate any diagnostic. If the DOC delta T was bigger and was sustained sufficiently in a stationary condition, it could have triggered the static part.

Zone "C"

When the input temperature falls, the delay of the output could make the delta T very big and activate the static part with no reason. The algorithm recognizes that this delta T is only due to input variations, so it doesn't turn on.

Fault Management

The logic sets the fault while the monitoring is enabled AND while the output of a variable rate counter is higher than a tunable threshold.

The counter is an UP/DOWN type in order to ensure the error is set only after an unintended exothermal reaction has been detected for a certain total amount of time, based not only on the instantaneous result of the monitoring but also on his recent history.

The variable tunable rate of the counter allows the calibrator to decide different severity for the fault setting. Depending on the component temperature output and gradient, a factor is mapped in order to ensure faster error setting when the exothermal condition is more severe.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. An engine monitoring system to determine an unintended exothermic condition occurring in after-treatment (AT) components including a diesel particulate filter (DPF) of the engine exhaust system, wherein the AT components comprise a first AT component for treating exhaust gas, comprising:

a first temperature sensor upstream of the first AT component and arranged to sense exhaust gas temperature and issue a corresponding first temperature signal;

a second temperature sensor downstream of the first AT component and arranged to sense exhaust gas temperature and issue a corresponding second temperature signal;

a controller configured with a first function that monitors the first and second temperature signals and calculates a rate of change of temperature of exhaust gas at each sensor, and a second function that compares both the first and second temperature signals and the rate of change of temperature to predetermined thresholds for determining whether an unintended exothermic condition exists within the first AT component, and a third function that issues a fault signal;

a second AT component in series with the first AT component;

the second temperature sensor being between the first and second AT components;

a third temperature sensor downstream of the second AT component and arranged to sense exhaust gas temperature and issue a corresponding third temperature signal;

the first function monitors the third temperature signal and calculates a rate of change of temperature of exhaust gas at the third temperature sensor, and the second function compares the temperature and rate of change of temperature at the second and third temperature sensors to predetermined thresholds for determining whether an unintended exothermic condition exists within the second AT component, and the third function issues a fault signal.

2. The temperature monitoring system according to claim 1, wherein the third function is disabled during active DPF regeneration.

3. The temperature monitoring system according to claim 1, wherein the first AT component comprises a DOC unit.

4. The temperature monitoring system according to claim 1, wherein the first AT component comprises a DPF.

5. The temperature monitoring system according to claim 1, wherein the first AT component comprises a DOC unit and the second AT component comprises a DPF.

6. The temperature monitoring system according to claim 1, further comprising a MAF sensor that issues a MAF signal corresponding to a magnitude of mass air flow into the engine; and wherein the control calculates a gas space velocity based on the MAF signal, and an input gradient and partial and total input variations at a tunable sample time and delay, depending on the gas space velocity.

7. A method of monitoring to determine an unintended exothermic condition occurring in after-treatment (AT) components of the engine exhaust system, wherein the AT components comprise a first AT component for treating exhaust gas, comprising the steps of:

monitoring temperature downstream of the first AT component (T_out) and if the temperature downstream of the first AT component is higher than a threshold at any time establishing a peak fault detection;

monitoring temperature upstream of the first AT component (T_in) and the temperature downstream of the first AT component (T_out) both over time, and if the time derivative of the temperature downstream of the first AT component is higher than a threshold and the time derivative of the temperature upstream of the first AT component is lower than another threshold establishing a dynamic fault detection; and calculating and monitoring average temperature (T_ave) in the first AT component, wherein $$T\_ave = (T\_in) + (T\_out - T\_in) \times (c\_fac)$$

where:

T_ave=average component temperature

T_in=upstream temperature

T_out=downstream temperature c_fac=tunable factor calculating and monitoring gas space velocity (sv_gas) in the first AT component, wherein $$sv\_gas = \frac{\dot{V}_{gas}}{Vol} = \frac{[L/s]}{[L]} = [1/s]$$

and $$\dot{V}_{gas} = \frac{MAF\_KGH\_PF * 1000 * 22.4}{(gas\_molecular\_weight) * 3600} = \frac{[Kg/h] * [g/Kg] * [L/mol]}{[g/mol] * [s/h]} = \frac{[L]}{[s]}$$

wherein

MAF_KGH_PF is engine intake mass air flow

L=liters s=seconds h=hours g=grams mol=moles

Kg=kilograms and Vol=volume, displacement in liters of the first AT component;

monitoring the temperature difference Tout−Tin, and if the temperature downstream of the first AT component is increasing, and if the average temperature in the first AT component is higher than a threshold, and if the temperature difference is higher than a map-based variable threshold that is dependent on average temperature, and if a check of the upstream temperature looking back over time determines that the upstream temperature hasn't been increasing, establishing a static fault detection.

* * * * *